United States Patent [19]
Furuta

[11] Patent Number: 5,749,170
[45] Date of Patent: May 12, 1998

[54] AUTOMATIC WATER SUPPLY DEVICE

[75] Inventor: Mikio Furuta, Nagoya, Japan

[73] Assignee: Fulta Electric Machinery Co., Ltd., Nagoya, Japan

[21] Appl. No.: 673,153

[22] Filed: Jun. 25, 1996

[30] Foreign Application Priority Data

| Jun. 30, 1995 | [JP] | Japan | 7-164903 |
| Aug. 23, 1995 | [JP] | Japan | 7-214940 |
| Jan. 30, 1996 | [JP] | Japan | 8-014454 |

[51] Int. Cl.$^6$ ................................ A01G 31/00
[52] U.S. Cl. .................................. 47/62; 47/79
[58] Field of Search ................... 47/62 E, 79 N, 47/81 N, 62, 79, 81

[56] References Cited

U.S. PATENT DOCUMENTS

| 3,758,987 | 9/1973 | Crane, Jr. |
| 4,324,069 | 4/1982 | Flagg ................... 47/62 E |

FOREIGN PATENT DOCUMENTS

| 0424540 A1. | 5/1991 | European Pat. Off. ........... 47/62 E |
| 85 05 488 | 7/1987 | Germany. |
| 1271457 | 11/1986 | U.S.S.R. ...................... 47/62 E |
| 2 241 860 | 9/1991 | United Kingdom ............... 47/72 E |
| 2 249 247 | 5/1992 | United Kingdom. |

Primary Examiner—Henry E. Raduazo
Assistant Examiner—Joanne C. Downs
Attorney, Agent, or Firm—Nikaido, Marmelstein, Murray & Oram LLP

[57] ABSTRACT

An automatic water supply device comprises a pot-shaped case having a space enclosing a flowerpot in the inside, a supporting bed of reverse bowl shape enclosed in the case and holding the flowerpot thereon, a control unit arranged in a gap between the inside of the case and the flowerpot and containing at least an air pump, a controller and a timer, an air tube connected to outlet side of the air pump and having a front end part communicating with the inside of the supporting bed, and a device to exhaust air in the supporting bed when the supplying water is finished. Since the water supplying device basically has simple structure that a supporting bed of reverse bowl shape is inserted from the upper side and enclosed in the case, a part storing water can be taken to pieces and inspection or cleaning is easy. Also since the control unit is arranged between the inside of the case and the flowerpot, it can be easily detached and when the casing of the unit is made the waterproof structure, it can be used in enclosing in any position in the case without trouble. Further since all parts including the control unit are enclosed in the case, mechanical parts are not exposed or projected and good appearance can be secured. Also noise of the air pump can be prevented from being dispersed to the outside.

5 Claims, 10 Drawing Sheets

5,749,170

AUTOMATIC WATER SUPPLY DEVICE

BACKGROUND OF THE INVENTION

1. Field of the Invention

The present invention relates to an automatic water supply device for supplying water into a flowerpot automatically.

2. Description of the Prior Art

In the prior art, as an automatic water supply device for supplying water into a flowerpot automatically, JP-U 3-114940, JP-U 4-65057 and the like disclose an automatic water supply device where water is supplied into an enclosing tank enclosing a flowerpot from the bottom part of the enclosing tank and the flowerpot is in water.

In such an automatic water supplying device, since an enclosing tank for a flowerpot is formed in a body case on upper side and a water tank is provided on lower side of the body case and a conduit tube is projected downward from the bottom part of the enclosing tank positioned on upper side into the water tank, height of the water tank becomes high and shape of the body case becomes long in the vertical direction thereby the body case has a defect in that its shape becomes unstable.

Also in the water supply device disclosed in JP-U 3-114940, since a control device such as an air pump is enclosed in the water tank, in order to secure the waterproof property in the part where the control device is enclosed, a complicated waterproof structure must be used thereby a problem exists in that the number of parts is increased and the waterproof property is deteriorated during repair, maintenance or inspection.

Further in such a water supplying device, the water tank within the body case is formed by arranging partition walls in the case, and in order to secure the waterproof property, usually the partition walls are fixed in the body case completely. Therefore when the inside of the body case is cleaned, since the partition walls can not be taken to pieces, the inside of the water tank can not be cleaned and fur or the like is stored in the water tank and trouble is caused thereby a problem exists in that repair, maintenance or inspection is very difficult.

SUMMARY OF THE INVENTION

An object of the present invention is to provide an automatic water supply device which can be taken to pieces easily during maintenance, inspection, repair or cleaning and can be easily assembled without considering the waterproof property.

Another object of the present invention is to provide an automatic water supply device where height of the device is made low and the device can enclose and supply water in a flowerpot in a stable attitude.

In order to attain the foregoing objects, an automatic water supply device of the present invention comprises a pot-shaped case having space enclosing a flowerpot in the inside, a supporting bed of reverse bowl shape enclosed upside down in the pot-shaped case for supporting the flowerpot thereon, a control unit arranged in the pot-shaped case at a gap between the inner surface of the case and the flowerpot and containing at least an air pump, a controller and a timer, an air tube connected to the exhaust side of the air pump and having the front end portion communicating with the inside of the supporting bed, and air exhaust means for exhausting air within the supporting bed at the finishing state of the supplying water.

Here as air exhaust means, such configuration may be adopted that when the air pump is stopped, air within the supporting bed is exhausted naturally through the air pump and the air tube by the air pressure due to the weight at position higher than that of the supporting bed.

Since this automatic water supply device basically has such simple configuration that the supporting bed of bowl shape laid upside down is simply inserted from the upper side and enclosed in the pot-shaped case, the part storing water can be taken to pieces quite simply and can be inspected or cleaned simply. Also since the control unit is arranged between the inner surface of the pot-shaped case on upper side and the flowerpot, it can be easily detached, and if the casing of the control unit is made the waterproof structure, the control unit can be enclosed at any position in the pot-shaped case and can be used without any trouble. Of course, since all parts including the control unit are enclosed in the pot-shaped case, the mechanical parts are not exposed or projected and the good appearance can be secured. Also the noise of the air pump can be prevented from being dispersed to the outside.

In such an automatic water supply device, the flowerpot is enclosed in the pot-shaped case and held on the supporting bed in the case. Water is supplied into the pot-shaped case nearly at the level slightly lower than the ceiling plate of the supporting bed. The control circuit of the control unit is turned on and the automatic supplying water operation is started. After lapse of the previously set time, the air pump is driven and air is sent through the air tube into the supporting bed. As air is filled in the supporting bed of bowl shape laid upside down, the air within the supporting bed is expanded and the water level within the supporting bed is pushed down thereby the water within the supporting bed is pushed out of the supporting bed.

Then the pushed-out water rises in the gap between the inner surface of the pot-shaped case and the flowerpot, and when the water level within the pot-shaped case attains to the suitable level, the air pump is stopped by the time limiting operation by the timer, by detection of the water level by the level sensor, or by the moisture sensor detecting the moisture content within the flowerpot. In this state, the lower portion of the flowerpot becomes the immersed state in the water and the supplying water is performed from the bottom of the flowerpot. Then if the air pump is stopped, since the air within the supporting bed is closed substantially, the state is held for a while.

And then, the air within the supporting bed is exhausted to the outside through the air tube and the air pump, and as the water level within the supporting bed rises attendant on the decrease of the air, the water level existing between the inner surface of the pot-shaped case and the flowerpot is lowered gradually until the water level inside the supporting bed and the water level outside the supporting bed become nearly equal, and the flowerpot is completely separated from the water and the supplying water is finished. Such operation is repeated every prescribed time by the time limiting operation of the timer, and the supplying water of the flowerpot is performed.

DESCRIPTION OF THE PREFERRED EMBODIMENTS

First Embodiment

Figure 1:
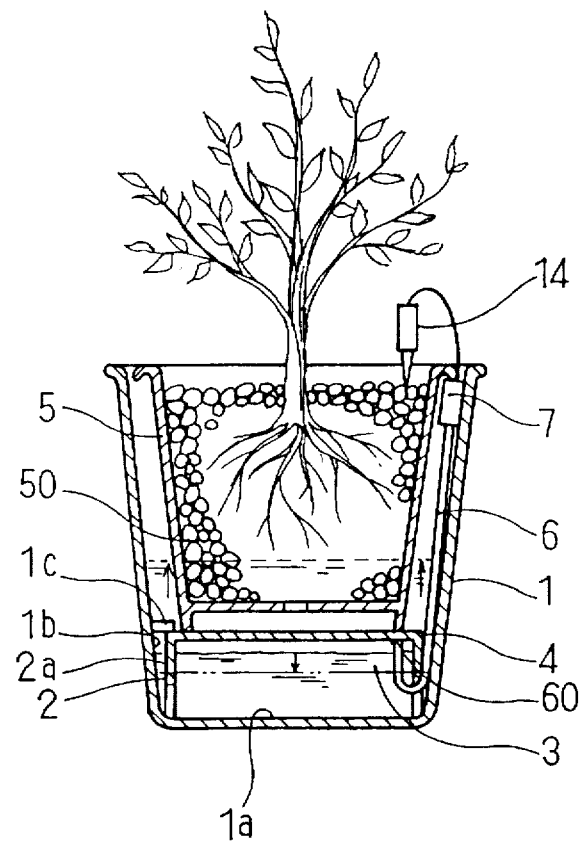
FIG. 1 is a sectional view of an automatic water supply device in a first embodiment of the invention.

FIG. 1 to FIG. 4 show an automatic water supply device in a first embodiment of the present invention. A pot-shaped case 1 is formed in pot shape with the upper surface opened and the bottom part closed, and has such size that a flowerpot 5 can be inserted from the upper side and enclosed in the case 1. A supporting bed 2 is enclosed in the pot-shaped case 1 so that it can be inserted from the upper side. The supporting bed 2 is formed in bowl shape laid upside down and in reverse bowl shape having the flat upper surface, and has such size that it can be arranged on the bottom part inside the pot-shaped case 1 through a small gap. The pot-shaped case 1 and the supporting bed 2 can be molded by synthetic resin, and various sorts of pattern and color can be applied to the outer circumferential surface of the pot-shaped case 1. However, plain surface without any pattern or any color may be used, or the pot-shaped case 1 can be used in enclosed state in a fancy box so that the fancy box with beautiful appearance comes to the outside of the pot-shaped case 1.

There is no problem when the supporting bed 2 is simply inserted in the pot-shaped case 1 because the supporting bed 2 is pushed by the flowerpot 5 from the upper side. However, in order to prevent the floating due to the buoyancy securely, an engaging convex portion 1c may be provided at the inside of the pot-shaped case 1 so that the floating of the supporting bed 2 can be prevented by the engaging convex portion 1c. The supporting bed 2, the inside bottom surface 1a and the bottom side wall inner surface 1b of the pot-shaped case 1 constitute a water tank 3 of upper side closing type.

Figure 2:
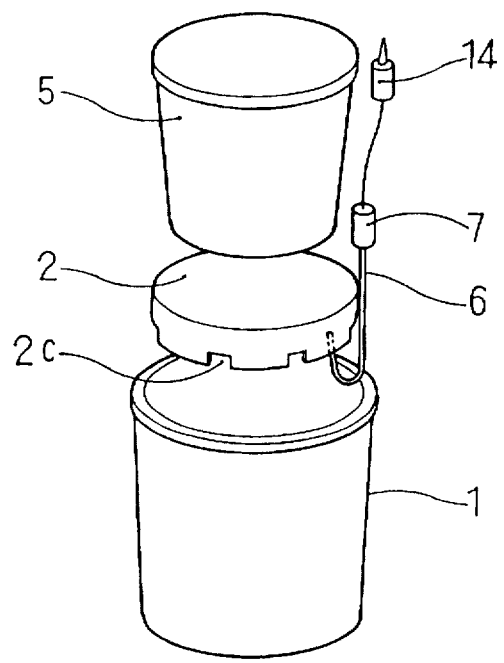
FIG. 2 is an exploded perspective view of the water supply device in FIG. 1.
Figure 3:
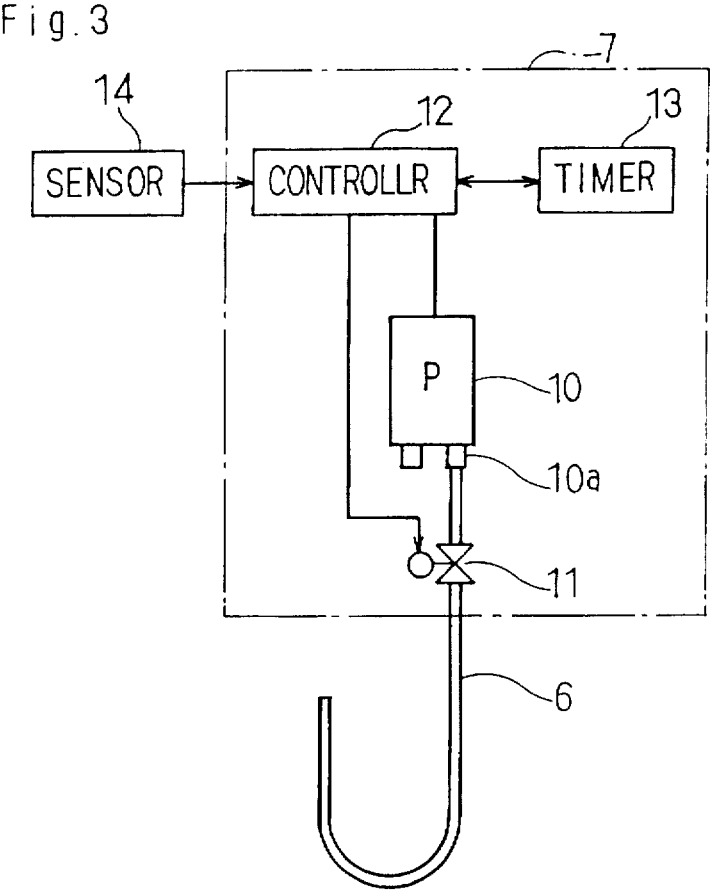
FIG. 3 is a configuration block diagram of a control unit 7.

As shown in FIG. 2, a plurality of recesses are formed as conduits 2c at the lower end part of the supporting bed 2, and the conduit 2c communicate with a water flow path 4 formed between the bottom side wall inner surface 1b of the pot-shaped case 1 and the circumferential surface 2a of the supporting bed 2. Consequently, when water is supplied into the pot-shaped case 1 in the vicinity of the supporting bed 2, the water advances into the supporting bed 2 and the water flow path 4 around the supporting bed 2. When air is compressed and supplied into the supporting bed 2, the water pushed out from the inside of the supporting bed 2 passes through the conduits 2c and the water flow path 4 and advances between the flowerpot 5 and the pot-shaped case 1.

A control unit 7 is arranged between the inner surface of the pot-shaped case 1 on the upper side and the flowerpot 5 in attachable or detachable state. The control unit 7 contains an air pump 10 driven by a motor or the like, an electromagnetic valve 11 connected to an exhaust port 10a of the air pump 10, a timer 13 and a controller 12 driving and controlling the air pump 10 and the electromagnetic valve 11 in response to operation of a moisture sensor 14. The control unit 7 is usually enclosed in the casing of the waterproof structure.

An air tube 6 is connected through the electromagnetic valve 11 to the exhaust port 10a of the air pump 10. The air tube 6 has an opened front end portion 60 arranged on the upper end position within the supporting bed 2 as shown in FIG. 1. A moisture sensor 9 is arranged so as to be inserted to soil 50 within the flowerpot 5, and detects the moisture content within the flowerpot 5 and sends a signal corresponding to the moisture content to the controller 12.

Next, operation of the automatic water supplying device during running will be described. The flowerpot 5 is inserted from the upper side into the pot-shaped case 1 and held on the supporting bed 2 within the case 1. Water is supplied into the pot-shaped case 1 at level slightly lower than the ceiling plate of the supporting bed 2.

In this state, the controller 12 of the control unit 7 is turned on and the automatic supplying water operation is started. After lapse of time previously set in the timer 13, the air pump 10 is driven and air is sent from the exhaust port 10a through the electromagnetic valve 10 and the air tube 6 into the supporting bed 2. When air is compressed and filled in the supporting bed 2 in bowl shape laid upside down, the air chamber within the supporting bed 2 is expanded and the water level within the supporting bed 2 is pushed down thereby the water within the supporting bed 2 is pushed out of the supporting bed 2.

The pushed-out water rises in a gap between the inner surface of the pot-shaped case 1 and the flowerpot 5, and when the water level within the pot-shaped case 1 attains to level in the vicinity of the moisture sensor 14, the controller 12 stops the air pump by input of a signal indicating rise of the moisture from the moisture sensor 14 or by the time limiting operation by the timer 13.

Then the flowerpot 5 becomes the state that its lower part is immersed in the water, and the supplying water is performed from the lower part of the flowerpot 5. Also when the electromagnetic valve 11 provided at the air tube 6 performs the closing operation and closes the air tube 6, since air within the supporting bed 2 is closed, the supplying water state is held for a while.

And then if the electromagnetic valve 11 performs the opening operation by the time limiting operation of the timer 13, air within the supporting bed 2 is exhausted to the outside through the air tube 6, the electromagnetic valve 11 and the air pump 10. The water level within the supporting bed 2 rises due to decrease of the air within the supporting bed 2, and the water level between the inner surface of the pot-shaped case 1 and the flowerpot 5 is lowered gradually until the water level inside the supporting bed and the water level outside the supporting bed become nearly the same. Then the flowerpot 5 is separated from the water completely and the supplying water is finished. Such operation is repeated every prescribed time by the time limiting operation of the timer 13, and the supplying water of the flowerpot 5 is performed periodically.

Figure 4:
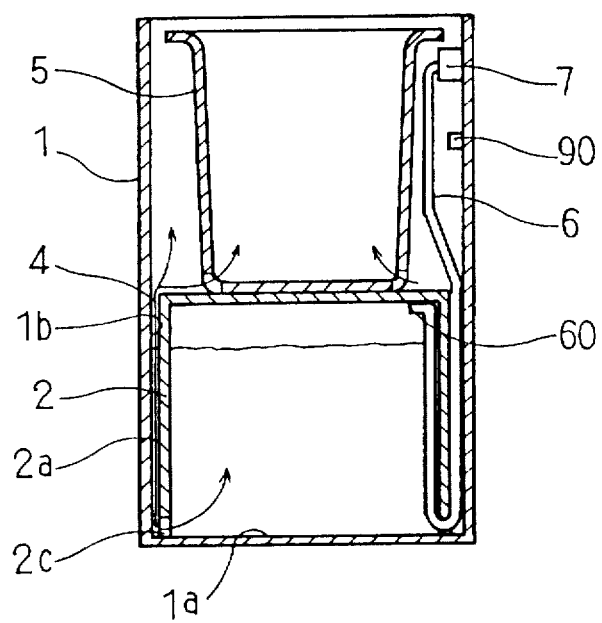
FIG. 4 is a sectional view of a water supply device with structure modified.

FIG. 4 shows another embodiment. In a water supply device of FIG. 4, in place of the moisture sensor 14 as above described, a level sensor 90 is arranged at the intermediate level position within the pot-shaped case 1. The level sensor 90 is connected to the controller 12 as above described, and when the water level rises to the level position, the level sensor 90 sends a water detecting signal to the controller 12. The stop operation of the air pump 10 or the like after outputting the water level detecting signal from the level sensor 90 to the controller 12 is the same as in the preceding embodiment. The control unit 7 is arranged to the upper part within the pot-shaped case 1 in attachable or detachable state in similar manner to the above description, but the level sensor 90 can be arranged in any position lower than this.

Thus since the supporting bed 2 is inserted from the upper side into the pot-shaped case 1 in attachable or detachable state and also the control unit 7 is inserted and arranged in a gap between the inner surface of the pot-shaped case 1 on upper side and the flowerpot 5 in attachable or detachable state, when the device is washed or when parts are exchanged or repaired, the water supply device as a whole can be taken to pieces or assembled simply and the waterproof property need not be considered during the work.

In the embodiment as above described, after air is supplied into the supporting bed 2 by the air pump 10 and the water level within the case is raised and the supplying water state and the air pump 10 are stopped, the air exhaustion is stopped by the electromagnetic valve 11 and the supplying water state is held for a while, but when the water supply device is used in every short supplying water time without holding the supplying water state, the electromagnetic valve 11 is not used and the air tube 6 may be connected directly to the air pump 10.

Second Embodiment

FIG. 5 to FIG. 14 show a second embodiment of the present invention. The automatic water supply device comprises a pot-shaped case 21 enclosing a flowerpot 27, and a water tank 22 of lateral setting type enclosed in a gap formed between the inner wall of the pot-shaped case 21 and the flowerpot 27 when the flowerpot 27 is enclosed in the pot-shaped case 21.

Figure 7:
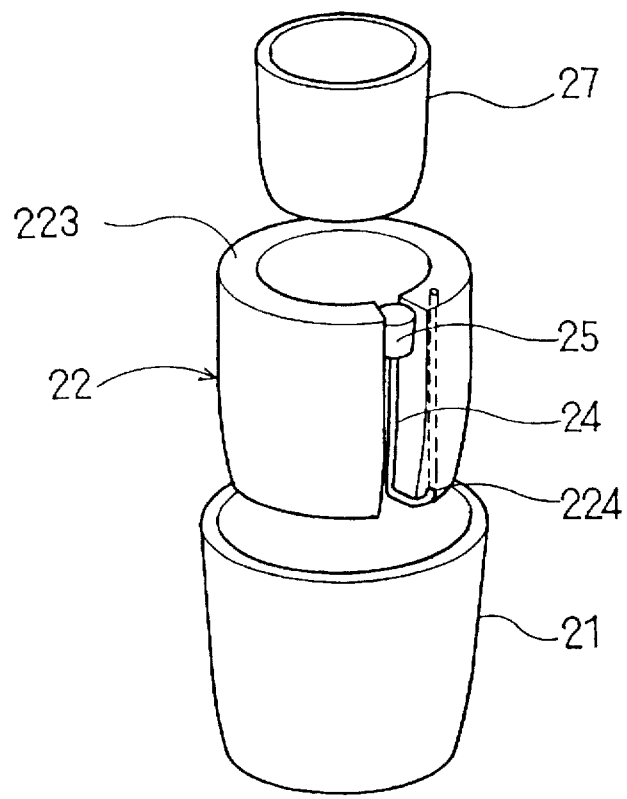
FIG. 7 is an exploded perspective view of the water supply device.

The water tank 22 comprises the upper part in closed structure and the bottom part having an opening part 224, and is formed in nearly cylindrical shape partially cut away in longitudinal direction as shown in FIG. 7. That is, the water tank 22 has a cavity of nearly cylindrical shape surrounded by an inner side wall 221, an outer side wall 222 and a ceiling part 223, and an opening part 224 is formed at the bottom part of the water tank 22 and leads to the inside of the pot-shaped case 21.

Further, a space to enclose the flowerpot 27 is formed at the center part of the water tank 22, and a pot receiving part 225 of flange shape is formed at the lower portion of the space, i.e., at the inside of the bottom part of the water tank 22.

Figure 5:
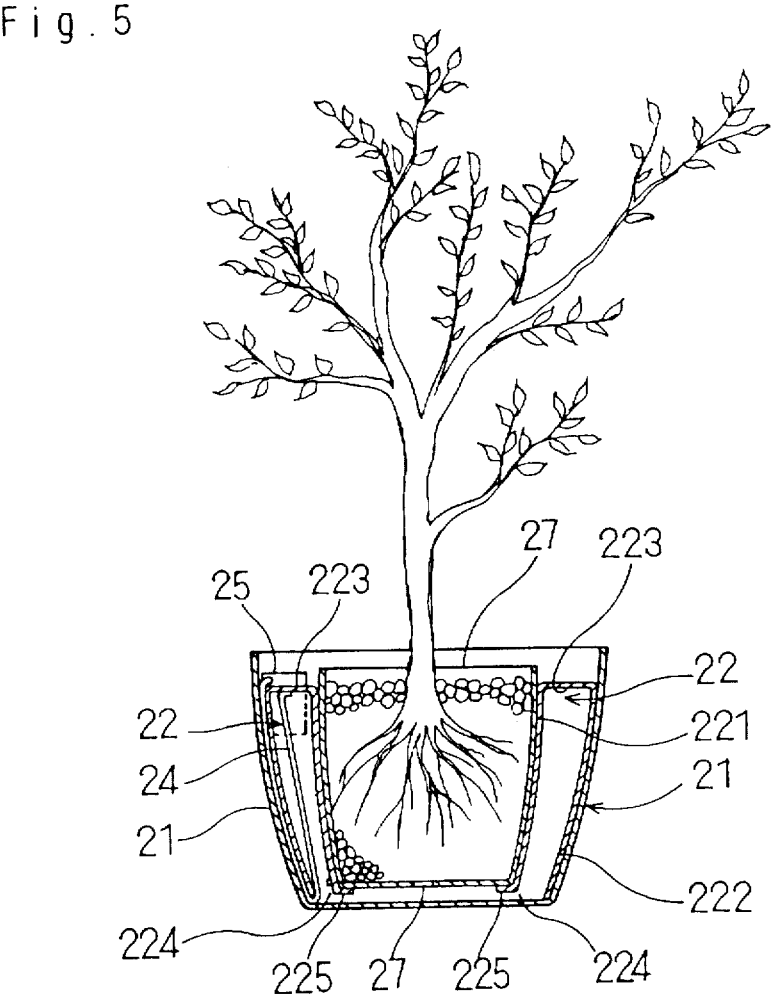
FIG. 5 is a sectional view of an automatic water supply device in a second embodiment in use state.

The water tank 22 can be easily enclosed from the upper side into the pot-shaped case 21 in attachable or detachable state, and the flowerpot 27 is held on the pot receiving part 225 thereby the water tank 22 is not floated but arranged to the definite position within the pot-shaped case 21. In this case, a gap leading to the opening part 224 of the water tank 22 is formed under the flowerpot 27 as shown in FIG. 5.

Figure 6:
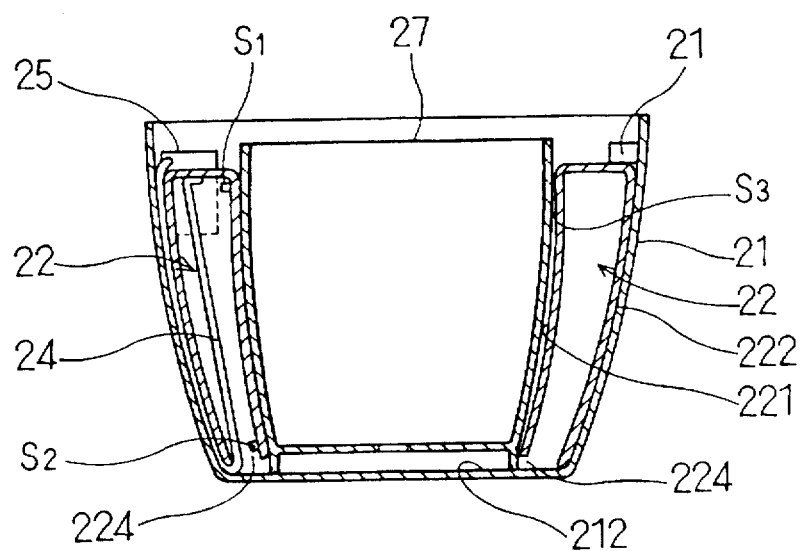
FIG. 6 is a sectional view of the water supply device in FIG. 5.

The water tank 22 may be prevented from being floated not providing the pot receiving part 225, and such example is shown in FIG. 6 or the like. That is, as shown in FIG. 6, at the upper part of the inside of the pot-shaped case 21, an engaging convex part 211 is partially projected. The ceiling part 223 of the water tank 22 abuts on the lower side of the engaging convex part 211 thereby the water tank 22 is prevented from being floated.

In this case, the flowerpot 27 advances to the bottom part of the center space of the water tank 22, and is held on the bottom plate 212 of the pot-shaped case 21. However, the bottom part of the flowerpot 27 usually has a space as shown in FIG. 6, and the opening part 224 of the water tank 22 and the space at the bottom part of the flowerpot 27 communicate with each other.

Figure 8:
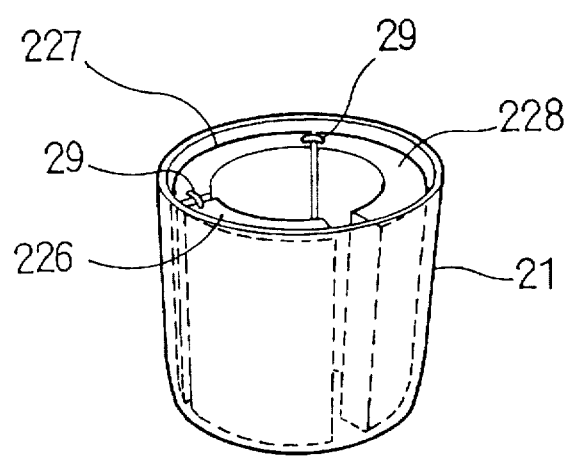
FIG. 8 is a perspective view of a device having a water tank of other structure.

In addition, as shown in FIG. 8, a water tank of nearly cylindrical shape can be formed in dividing in two to three pieces, such as water tanks 226, 227, 228, and when the water tank is formed in dividing, molding of the tank by synthetic resin becomes easy. Also each of these water tanks 226, 227, 228 comprises the upper part in closed structure and the bottom part having an opening part as above described, and in order to connect the upper space of each tank, a communication tube 29 is connected to each other.

Figure 9:
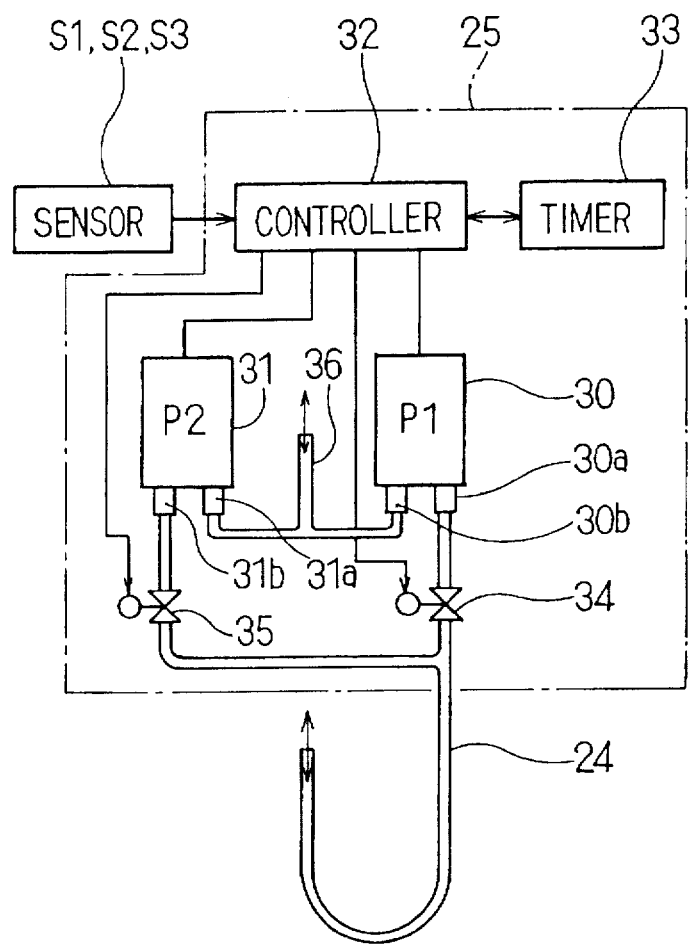
FIG. 9 is a configuration block diagram of a control unit 25.

As shown in FIG. 7, a control unit 25 and an air tube 24 are enclosed in attachable or detachable state in a space formed in that a part on the circumference of the water tank 22 is cut away. The control unit 25 comprises a suction air pump 30 driven by a motor or the like, an exhaust air pump 31, electromagnetic valves 34, 35, a timer 33, and a controller 32 for driving and controlling the air pumps and the electromagnetic valves in response to operation of the timer 33 and level sensors S1, S2, S3 as shown in FIG. 9.

The electromagnetic valve 34 is connected to an outlet port 30a of the suction air pump 30, and the electromagnetic valve 35 is connected to an inlet port 31b of the exhaust air pump 31. An air tube 24 is connected to the opposite side of the electromagnetic valves 34, 35, and an atmosphere tube 36 is connected to an inlet port 30b of the suction air pump 30 and an outlet port 31a of the exhaust air pump 31.

An opening front end portion of the air tube 24 is inserted into the water tank 22 through the opening part 224 of the bottom part and is arranged on the upper end portion within the water tank 22. The level sensors S1, S2, S3 each detecting the water level and outputting a detection signal are arranged at the upper end portion and the lower end portion inside the water tank 22 and at the position slightly upper than the intermediate position outside the water tank (inside the pot-shaped case), and a detection signal outputted from each level sensor is sent to the controller 32.

Next, operation of the automatic water supply device during running will be described. The flowerpot 27 is enclosed from the upper side in the inside of the water tank 22 within the pot-shaped case 21. Water is supplied into the pot-shaped case 21 at level of about a half.

Figure 14:
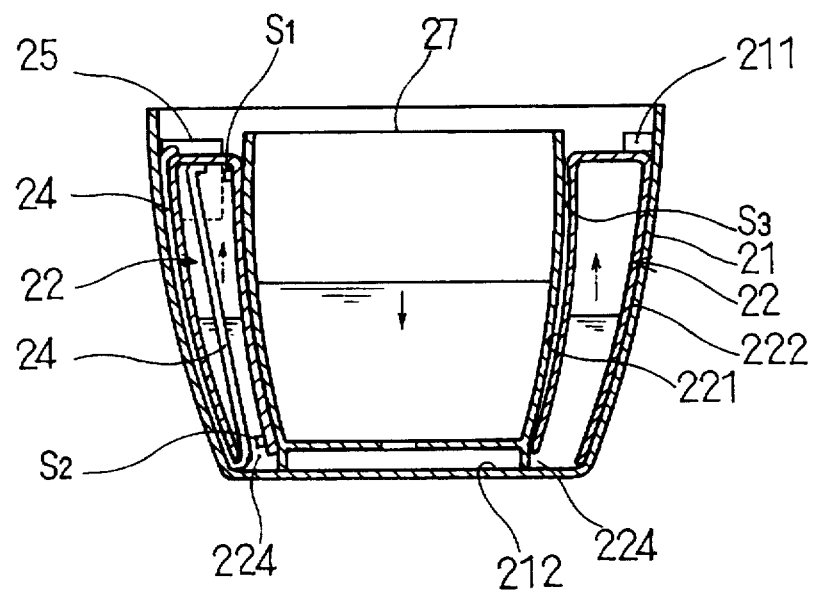
FIG. 14 is a sectional view in state that water is returned into the water tank 22.

In this state, the controller 32 of the control unit 25 is turned on and the automatic supplying water operation is started. First, the controller 32 opens the electromagnetic valve 25 and drives the exhaust air pump 31. Thereby the air remaining at the upper portion within the water tank 22 is exhausted through the air tube 24, the electromagnetic valve 35, the pump 31 and the atmosphere tube 36, and the water within the pot-shaped case 21 is sucked into the water tank 22 from the opening part 224 as shown in FIG. 14.

Figure 11:
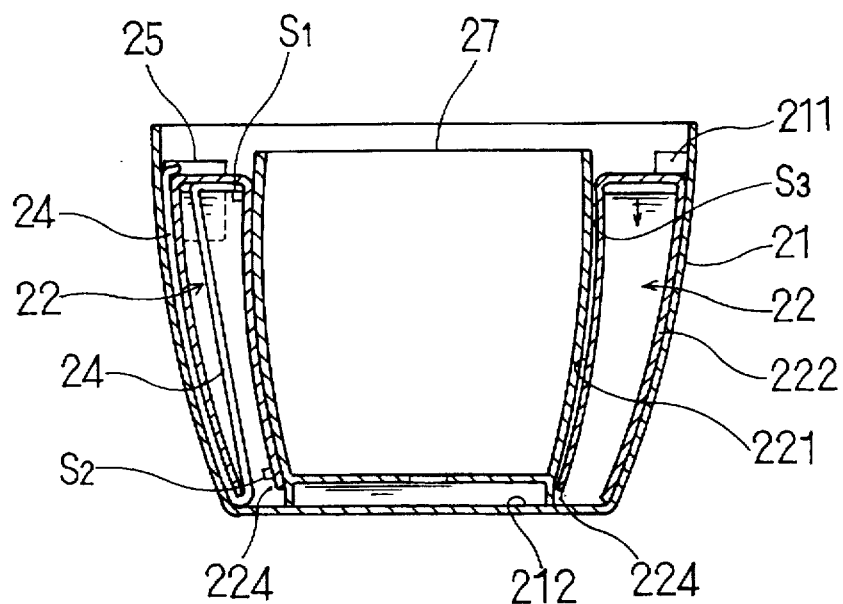
FIG. 11 is a sectional view in state that water is stored in a water tank 22.

When the water within the pot-shaped case 21 falls to the lowest level (under the bottom part of the flowerpot 27) and the water level within the water tank 22 becomes the highest level, the exhaust air pump 31 is stopped by the detecting operation of the level sensor S1 and the electromagnetic valve 35 is closed, and as shown in FIG. 11, water is stored in the water tank 22 and no water exists around the flowerpot 27. This state is the non-supplyed water state, i.e., the normal state.

And then, after lapse of the time previously set, the electromagnetic valve 34 is opened by the time limiting operation of the timer 33 and the suction air pump 30 is driven, and the atmospheric air is sent through the atmosphere tube 36, the pump 30, the electromagnetic valve 34 and the air tube 24 to the upper part within the water tank 22.

Figure 12:
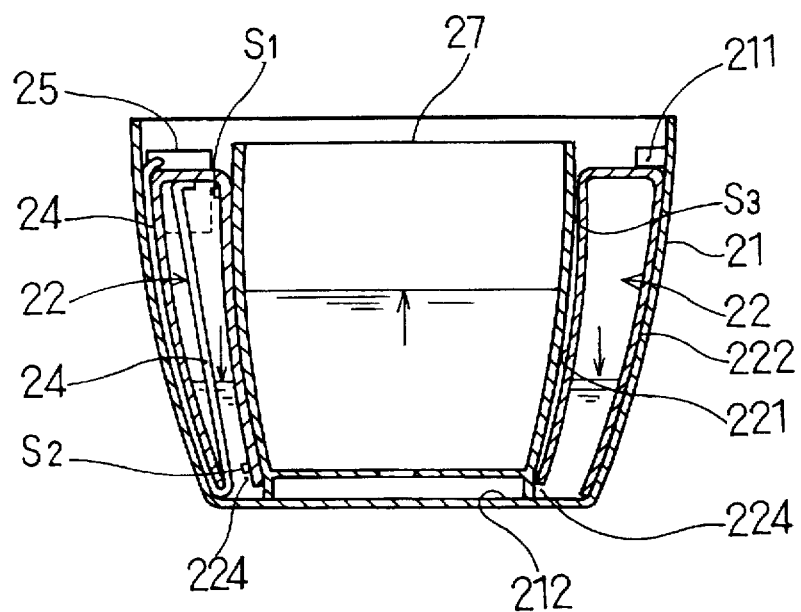
FIG. 12 is a sectional view in state that water flows into a flowerpot 27.
Figure 13:
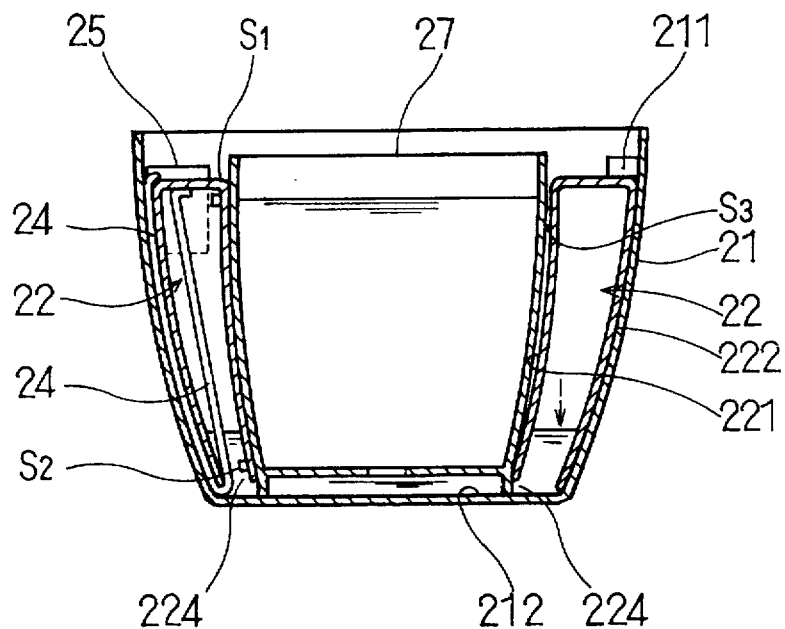
FIG. 13 is a sectional view in state that the flowerpot 27 is in water completely.

Thereby as shown in FIG. 12, water in the water tank 22 is pushed out through the opening part 224 into the pot-shaped case 21 and the water level in the pot-shaped case 21 rises, and further in state as shown in FIG. 13 for example, the suction air pump 30 is stopped by the detecting operation of the level sensor S3 and the electromagnetic valve 34 is closed. Thereby the flowerpot 27 within the pot-shaped case 21 becomes the immersed state in the water, and the water enters from the bottom part and the flowerpot is in water.

In this state, when the supplying water of the prescribed time is finished, the electromagnetic valve 35 is opened by the time limiting operation of the timer 33 and the exhaust air pump 31 is driven. The air remaining at the upper portion within the water tank 22 is exhausted through the air tube 24, the electromagnetic valve 35, the pump 31 and the atmosphere tube 36 as above described, and the water within the pot-shaped case 21 is sucked into the water tank 22 from the opening part 224 as shown in FIG. 14.

When the water within the pot-shaped case 21 falls to the lowest level (under the bottom part of the flowerpot 27) and the water level within the water tank 22 becomes the highest level, the exhaust air pump 31 is stopped by the detecting operation of the level sensor S1 and the electromagnetic valve 35 is closed, and as shown in FIG. 11, such non-supplyed water state is returned that water is stored in the water tank 22 and no water exists around the flowerpot 27.

In addition, in such state that the water in the pot-shaped case 21 is decreased and even if the exhaust air pump 31 is operated, the water level does not rise to the level sensor S1, the exhaust air pump 31 remains operating. In this case, the exhaust air pump 31 may be stopped by the time limiting operation of the setting time previously set in the timer 33.

Such operation is repeated every prescribed time by the time limiting operation of the timer 33, and the supplying water to the flowerpot 27 is performed periodically. The level sensor S2 is a sensor detecting the state that the water level within the water tank 22 falls abnormally. When the water level of the water tank 22 (within the flowerpot) due to the suction of plant or the like, the level sensor S2 sends a signal to the controller 22 and informs the abnormal state.

Figure 10:
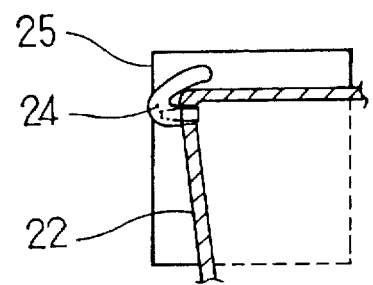
FIG. 10 a fragmentary enlarged sectional view showing connect structure of an air tube 24.

In this embodiment, although the air tube 24 is inserted from the opening part of the bottom of the water tank 22 into the tank, as shown in FIG. 10, a joint may be attached in the vicinity of the upper part of the water tank 22 and the air tube 24 may be connected there.

Further in this embodiment, although the two pumps, the suction air pump 30 and the exhaust air pump 31, are used, in the case of a pump having structure performing both operations, suction and exhaust, in changing (a pump having structure that a pump rotor can be driven in forward and reverse rotation, and suction is performed during forward rotation and exhaust is performed during reverse rotation), one pump can perform both operations. In this case, the air tube 24 may be connected to one of the inlet/outlet ports of the suction/exhaust pump through the electromagnetic valve.

Further in this embodiment, in order to hold the supplying water state and the non-supplying water state in definite time, although the electromagnetic valves 34, 35 are used, if a pump having structure capable of stopping air flow completely at the stopping state is used, the air tube 24 may be connected directly to the air pumps 30, 31 not using the electromagnetic valves 34, 35.

Thus since the water supply device has such structure that the water tank 22 is inserted from the upper side and enclosed into the pot-shaped case 21 in attachable or detachable state, and also the control unit 25 is inserted and arranged into the cutaway space of the water tank 22 in attachable or detachable state at the upper part within the pot-shaped case 21, when the device is washed or when parts are exchanged or repaired, the water supply device as a whole can be simply taken to pieces or assembled and the waterproof property need not be considered during the work. Also since the water tank 22 is enclosed in a gap between the surrounding wall of the pot-shaped case 21 and the flowerpot 27, height of the pot-shaped case 21 can be lowered and the water supply device can be made stable in appearance and physically.

Figure 15:
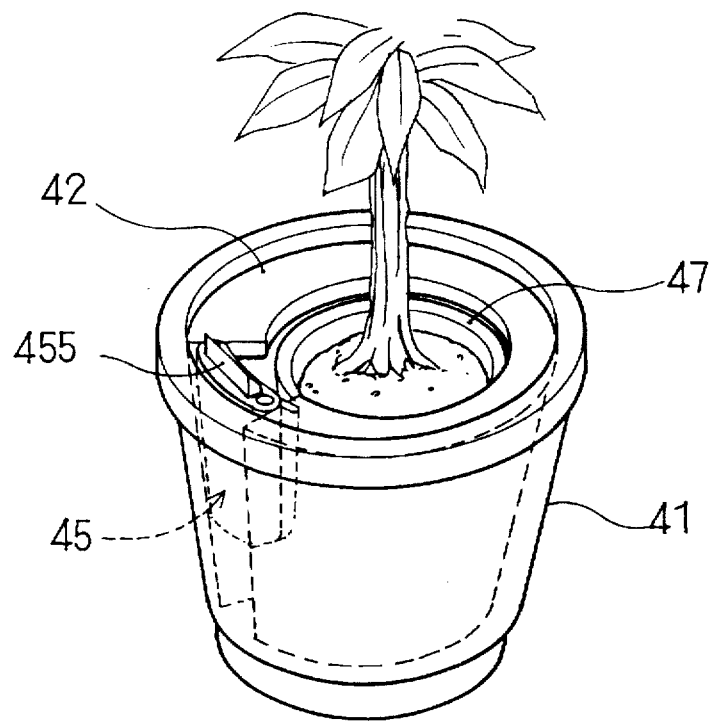
FIG. 15 is a perspective view of a water supply device in another embodiment.
Figure 16:
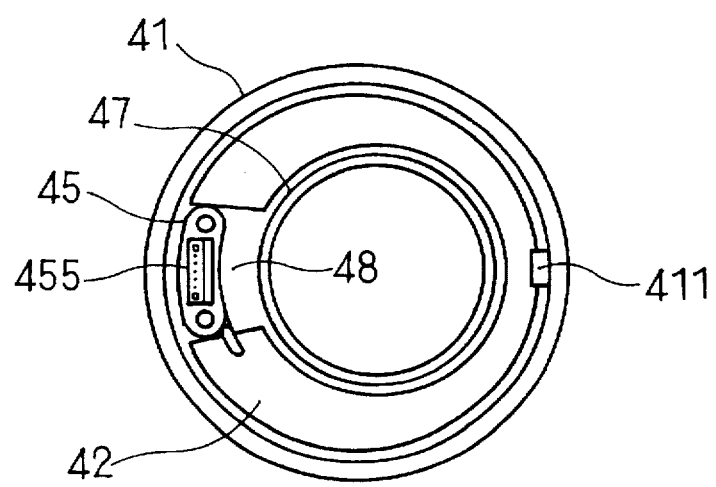
FIG. 16 is a plan view of the water supply device in FIG. 15.
Figure 17:
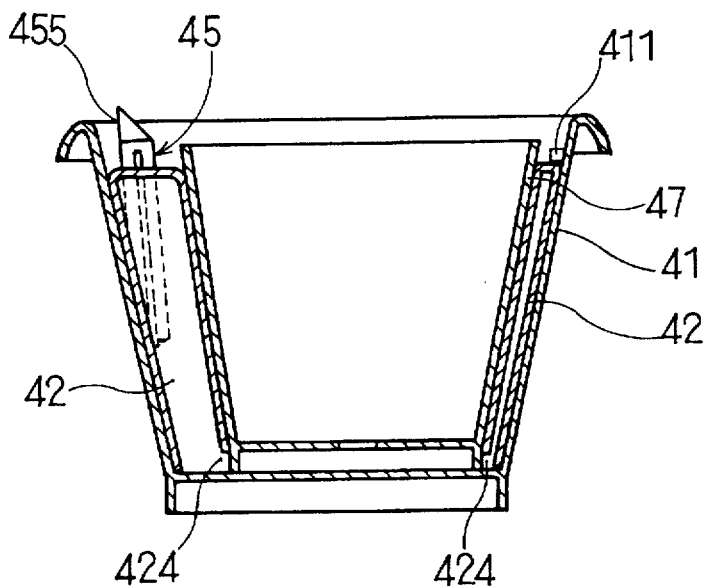
FIG. 17 is a sectional view of the water supply device.

FIG. 15 to FIG. 17 show a water supply device using another water tank 42. The water tank 42 of this water supply device is of lateral setting type as above described, but width in radial direction in a plan view is formed thick in one side and thin in other side and the water tank 42 is enclosed between the inner circumferential wall and the flowerpot 47 within the pot-shaped case 41 enclosing the flowerpot 47 as above described.

That is, the water tank 42 is formed in nearly cylindrical shape partially cut away longitudinally and width in radial direction is thick in one side (cutaway side) and thin in other side, and the water tank 42 comprises the upper part in closed state and the bottom part having an opening part 424 which communicates with the inside of the pot-shaped case 41. Also the water tank 42 is inserted and enclosed in the pot-shaped case 41, and is locked to the definite position within the pot-shaped case 41 and prevented from being floated by an engaging convex part 411 provided at the inside of the case 41.

A space to enclose the flowerpot 47 is formed at the center part of the water tank 42. The flowerpot enclosing space is formed in deviating, i.e., shifting to one side in a plan view of the pot-shaped case 41. Thereby the water tank 42 is formed so that width in radial direction in a plan view becomes thick in one side (cutaway side) and thin in other side.

The water tank 42 is formed so that the center space is deviated as above described, thereby a space (cutaway space) 48 for insertion of a control unit 45 can be formed large and even the control unit 45 of large size can afford to be enclosed in the pot-shaped case 41. Also the water tank 42 can be divided at the narrowest width longitudinally into two tanks, and molding by synthetic resin becomes easy by the dividing in two. In this case, the upper part of each tank may be connected by a communication tube in similar manner to FIG. 8 as above described.

Figure 18:
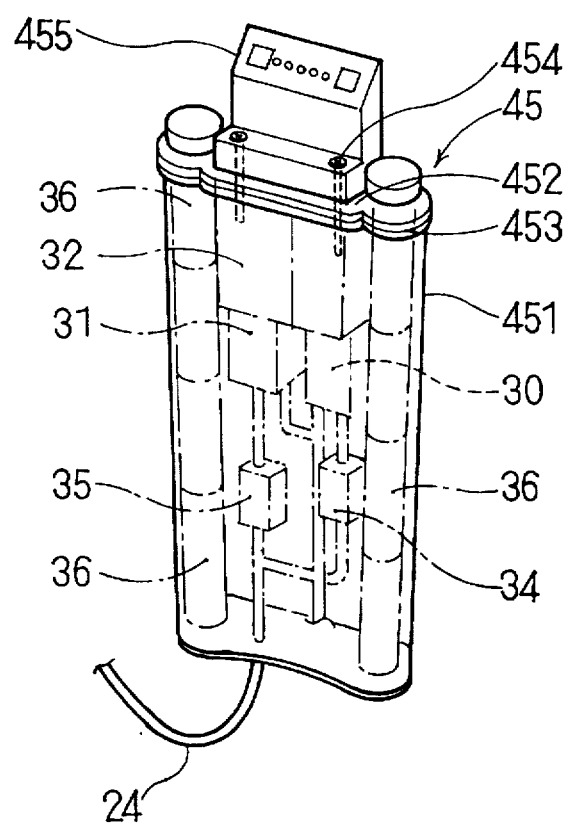
FIG. 18 is a perspective view of a control unit 45.

FIG. 18 shows an embodiment of a control unit 45 to be inserted from the upper side into a cutaway space of the water tank 42. The control unit 45 has a casing 451 which is thin and long in the vertical direction, and the casing 451 contains the suction air pump 30, the exhaust air pump 31, the electromagnetic valves 34, 35, the timer 33 and the controller 32 as above described, and also contains a battery 36 as power source. The casing 451 is of the waterproof structure.

An air tube 24 connected to the electromagnetic valves 34, 35 is drawn in the seal state from the bottom part of the casing 451. The air tube 24 communicates with the upper part of the water tank 42 through a joint or the like as shown in the figure, but the front end of the air tube 24 may be inserted from the opening part 424 of the bottom into the inside of the water tank 42 and may be positioned on the upper part within the tank.

The upper part of the casing 451 is closed through a seal member 453 by a cover 452 with an operation board 455 provided on the upper part, and is hermetically sealed by tightening with a screw 454 or the like. Switches of waterproof type is installed on the operation board 455, and the time setting of the timer 33 and the ON/OFF operation of the running are performed by these switches.

Thus if the control unit 45 being thin and long in the vertical direction is formed and the water tank 42 is formed in nearly cylindrical shape partially cut away longitudinally and width in the radial direction is made thick in one side (cutaway side) and thin in other side, a space to insert the control unit 45 can be taken much and even the pot-shaped case of small size can enclose the control unit 45 therein.

Figure 19:
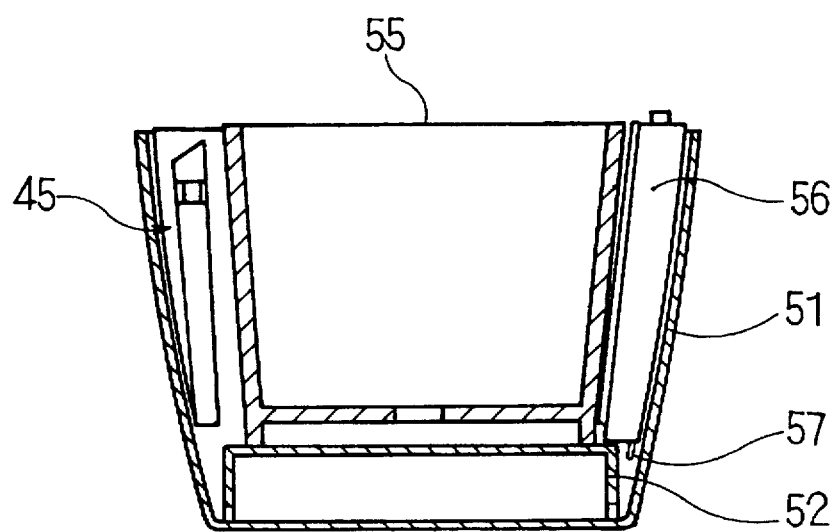
FIG. 19 is a sectional view of a water supply device in still another embodiment.

As shown in FIG. 19, even in a water supply device of supporting bed type as described in the first embodiment, that is, a device having structure that a supporting bed 52 of bowl shape laid upside down is held on the bottom part in the pot-shaped case 51 and a flowerpot 55 is held on the supporting bed 52, the control unit 45 as above described can be used in inserting in a gap between the pot-shaped case 51 and the flowerpot 55.

Also when water in the pot-shaped case is lacking, in order to supply water automatically, a reserve tank 56 may be inserted in a gap between the pot-shaped case 51 and the flowerpot 55. The reserve tank 56 is formed in that a cap is installed to a feed water hole provided on the upper part and a thin water outlet tube 57 is provided on the bottom part, and when the water level is lowered from the prescribed level, the water of the lacking quantity is supplied from the water outlet tube 57 into the pot-shaped case 51.

In addition, in all embodiments as above described, although one flowerpot is enclosed in the pot-shaped case, a plurality of flowerpots can be enclosed in the pot-shaped case. Also in this case, the control unit is enclosed in a gap between the inner surface of the pot-shaped case and the flowerpot as above described, but when a gap between the flowerpots is large, a spacer member having suitable volume to fill the gap is enclosed in the gap in the pot-shaped case.

What is claimed is:

1. An automatic water supply device comprising:

(a) a pot-shaped case having a space enclosing a flowerpot in an inside;

(b) a supporting bed of reverse bowl shape enclosed upside down in said pot-shaped case in an attachable or detachable state for supporting the flowerpot thereon;

(c) a control unit arranged between an inner surface of said pot-shaped case and the flowerpot in an attachable or detachable state and containing at least an air pump, a controller and a timer;

(d) an air tube connected to the outlet side of said air pump and having a front end part arranged communicating with an inside of said supporting bed; and (e) exhaust means for exhausting air within said supporting bed when the water supply is complete.

2. An automatic water supply device as set forth in claim 1, wherein said exhaust means exhausts air within the supporting bed naturally through the air tube and the air pump by the air pressure due to weight of water existing at a position higher than the position of the supporting bed when the air pump is stopped.

3. An automatic water supply device as set forth in claim 1, wherein a moisture sensor detecting the moisture content within the flowerpot is connected to said controller, and when the moisture sensor detects a prescribed moisture content, operation of the air pump is stopped.

4. An automatic water supply device as set forth in claim 1, wherein a level sensor detecting the water level within the pot-shaped case is connected to said controller, and when the level sensor detects a prescribed water level, operation of the air pump is stopped.

5. An automatic water supply device as set forth in claim 1, wherein said supporting bed is engaged with an engaging convex part provided in said pot-shaped case and is prevented from floating.

\* \* \* \* \*